US010938815B2

(12) United States Patent
Jain et al.

(10) Patent No.: US 10,938,815 B2
(45) Date of Patent: Mar. 2, 2021

(54) SYSTEM AND METHODS TO ESTABLISH USER PROFILE USING MULTIPLE CHANNELS

(71) Applicant: Aetna Inc., Hartford, CT (US)

(72) Inventors: Salil Kumar Jain, Jackson Heights, NY (US); Abbie Barbir, Ogdensburg, NY (US); Sylvan Tran, Corona, CA (US); Jayavardhan N. Marehalli, Newcastle, WA (US); Derek Swift, Lake George, NY (US)

(73) Assignee: Aetna Inc., Hartford, CT (US)

(*) Notice: Subject to any disclaimer, the term of this patent is extended or adjusted under 35 U.S.C. 154(b) by 0 days.

(21) Appl. No.: 16/417,314

(22) Filed: May 20, 2019

(65) Prior Publication Data

US 2019/0273740 A1 Sep. 5, 2019

Related U.S. Application Data

(62) Division of application No. 15/655,076, filed on Jul. 20, 2017.

(60) Provisional application No. 62/364,439, filed on Jul. 20, 2016.

(51) Int. Cl.
*H04L 29/06* (2006.01)
*H04L 9/32* (2006.01)
*G06F 7/04* (2006.01)
*H04L 29/08* (2006.01)
*G06F 21/32* (2013.01)
*H04W 8/18* (2009.01)

(52) U.S. Cl.
CPC .......... *H04L 63/0884* (2013.01); *G06F 21/32* (2013.01); *H04L 63/0861* (2013.01); *H04L 63/102* (2013.01); *H04L 67/306* (2013.01)

(58) Field of Classification Search
CPC ........ G06F 21/32; G06F 21/31; G06F 21/316; H04L 63/0861; H04L 63/0884; H04L 63/102; H04L 67/22; H04L 67/306; G06Q 30/0269; G06Q 20/40; G06Q 20/4016; H04W 12/00; H04W 12/00512
See application file for complete search history.

(56) References Cited

U.S. PATENT DOCUMENTS 7,360,237 B2 * 4/2008 Engle .................. H04L 63/0272
                                                               709/219
8,151,327 B2 * 4/2012 Eisen .................. H04L 63/0876
                                                                   726/5

(Continued)

OTHER PUBLICATIONS

Li, Fudong, et al. "Behaviour profiling for transparent authentication for mobile devices." (2011). (Year: 2011).*

(Continued)

*Primary Examiner* — Michael Simitoski
(74) *Attorney, Agent, or Firm* — Leydig, Voit & Mayer, Ltd.

(57) ABSTRACT

Embodiments of the disclosure provide a method of establishing a user profile using multiple channels. Embodiments allow compatibility of the user profile across several authentication systems. The user profile is created upon registration and is updated with attributes after authenticating and authorizing the user according to a pre-defined assurance level. The user profile contains attributes pertaining to the user and user device. The attributes can be analyzed by authentication systems to optimize data security.

18 Claims, 7 Drawing Sheets

(56) References Cited

U.S. PATENT DOCUMENTS

| | | | | |
|---|---|---|---|---|
| 8,370,389 B1* | 2/2013 | Dotan | G06F 21/43 | 707/781 |
| 8,554,912 B1* | 10/2013 | Reeves | G06F 21/552 | 709/225 |
| 8,635,662 B2* | 1/2014 | Lang | G06F 21/31 | 709/229 |
| 8,745,698 B1* | 6/2014 | Ashfield | H04L 63/08 | 726/4 |
| 8,856,894 B1* | 10/2014 | Dean | H04L 63/08 | 713/175 |
| 9,038,134 B1* | 5/2015 | Ackerman | H04L 63/08 | 726/2 |
| 9,405,897 B1* | 8/2016 | Bailey | G06F 21/44 | |
| 9,426,139 B1* | 8/2016 | McClintock | H04L 63/08 | |
| 9,514,293 B1* | 12/2016 | Moritz | H04L 63/102 | |
| 9,639,689 B1* | 5/2017 | Herskovic | G06F 21/44 | |
| 9,661,073 B2* | 5/2017 | Chang | H04L 67/306 | |
| 9,722,996 B1* | 8/2017 | Kolman | H04L 63/083 | |
| 9,749,357 B2* | 8/2017 | Bailey | H04L 67/02 | |
| 9,769,143 B2* | 9/2017 | Jeffrey | H04L 63/0421 | |
| 9,948,510 B2* | 4/2018 | Kim | H04L 63/0846 | |
| 9,990,481 B2* | 6/2018 | Johansson | G06F 21/316 | |
| 10,015,185 B1* | 7/2018 | Kolman | H04L 63/1425 | |
| 10,043,180 B2* | 8/2018 | Mehew | G06Q 40/00 | |
| 10,091,230 B1* | 10/2018 | MacHani | H04L 63/1433 | |
| 10,091,312 B1* | 10/2018 | Khanwalkar | H04L 67/22 | |
| 10,282,728 B2* | 5/2019 | Avegliano | G06Q 20/322 | |
| 10,334,062 B2* | 6/2019 | Benson | H04L 67/303 | |
| 2004/0083394 A1* | 4/2004 | Brebner | G06F 21/31 | 726/19 |
| 2005/0097320 A1* | 5/2005 | Golan | G06F 21/40 | 713/166 |
| 2006/0015580 A1* | 1/2006 | Gabriel | H04N 7/17309 | 709/219 |
| 2007/0130473 A1* | 6/2007 | Mazotas | H04L 63/083 | 713/183 |
| 2007/0238065 A1* | 10/2007 | Sherwood | A61C 7/00 | 433/24 |
| 2008/0101658 A1* | 5/2008 | Ahern | G06F 21/32 | 382/115 |
| 2008/0162338 A1* | 7/2008 | Samuels | G06F 21/40 | 705/38 |
| 2008/0222706 A1* | 9/2008 | Renaud | H04L 63/1408 | 726/4 |
| 2009/0199264 A1* | 8/2009 | Lang | G06F 21/31 | 726/1 |
| 2010/0169192 A1* | 7/2010 | Zoldi | G06Q 40/00 | 705/30 |
| 2011/0016534 A1* | 1/2011 | Jakobsson | G06F 21/316 | 726/28 |
| 2011/0082768 A1* | 4/2011 | Eisen | G06Q 30/0609 | 705/26.35 |
| 2011/0131096 A1* | 6/2011 | Frew | G06Q 30/0269 | 705/14.66 |
| 2011/0238517 A1* | 9/2011 | Ramalingam | G06Q 20/40 | 705/26.1 |
| 2011/0277025 A1* | 11/2011 | Counterman | G06F 21/40 | 726/8 |
| 2011/0314558 A1* | 12/2011 | Song | G06F 21/316 | 726/28 |
| 2012/0166285 A1* | 6/2012 | Shapiro | G06Q 30/0251 | 705/14.58 |
| 2013/0042327 A1* | 2/2013 | Chow | G06F 21/316 | 726/28 |
| 2013/0054433 A1* | 2/2013 | Giard | H04L 67/22 | 705/34 |
| 2013/0097701 A1* | 4/2013 | Moyle | G06F 21/552 | 726/22 |
| 2013/0197998 A1* | 8/2013 | Buhrmann | G06Q 30/0255 | 705/14.53 |
| 2013/0305050 A1* | 11/2013 | Johnson | H04L 9/321 | 713/175 |
| 2013/0305320 A1* | 11/2013 | Warrick | H04L 61/103 | 726/4 |
| 2014/0172706 A1* | 6/2014 | Condry | G06Q 30/00 | 705/44 |
| 2014/0189829 A1* | 7/2014 | McLachlan | H04L 63/08 | 726/6 |
| 2014/0208419 A1* | 7/2014 | Chang | G06F 21/31 | 726/21 |
| 2014/0230020 A1* | 8/2014 | Mogaki | H04L 63/10 | 726/4 |
| 2014/0351109 A1* | 11/2014 | Peng | G06Q 40/00 | 705/35 |
| 2015/0039513 A1* | 2/2015 | Adjaoute | G06Q 20/4016 | 705/44 |
| 2015/0046332 A1* | 2/2015 | Adjaoute | G06N 5/043 | 705/44 |
| 2015/0128241 A1* | 5/2015 | Jakobsson | G06F 21/33 | 726/7 |
| 2015/0206214 A1* | 7/2015 | Adjaoute | G06Q 20/4016 | 705/26.35 |
| 2015/0220928 A1* | 8/2015 | Allen | G06Q 20/0655 | 705/67 |
| 2015/0237039 A1 | 8/2015 | Grajek et al. | | |
| 2015/0237049 A1 | 8/2015 | Grajek et al. | | |
| 2015/0242605 A1 | 8/2015 | Du et al. | | |
| 2015/0254659 A1* | 9/2015 | Kulkarni | A61L 31/145 | 705/71 |
| 2015/0269577 A1* | 9/2015 | Avegliano | G06Q 20/322 | 705/44 |
| 2015/0324810 A1* | 11/2015 | Vincent | G06Q 30/02 | 705/7.29 |
| 2015/0334169 A1* | 11/2015 | Hughes | H04L 63/102 | 709/204 |
| 2015/0373015 A1* | 12/2015 | Mary | G06F 21/44 | 726/9 |
| 2016/0063229 A1* | 3/2016 | Key | G06F 21/316 | 726/1 |
| 2016/0080943 A1* | 3/2016 | Ives-Halperin | G06Q 10/02 | 713/168 |
| 2016/0182481 A1 | 6/2016 | Audsin et al. | | |
| 2016/0182658 A1* | 6/2016 | Allinson | H04L 67/1097 | 709/224 |
| 2016/0189150 A1* | 6/2016 | Ahuja | G06Q 20/4016 | 705/44 |
| 2016/0203485 A1* | 7/2016 | Subramanian | G06Q 30/00 | 705/44 |
| 2016/0292688 A1* | 10/2016 | Barton | G06Q 20/02 | |
| 2016/0300237 A1* | 10/2016 | Khan | G06Q 20/3223 | |
| 2016/0314635 A1* | 10/2016 | Chen | G07C 9/00896 | |
| 2016/0321670 A1* | 11/2016 | Avegliano | G06Q 20/322 | |
| 2016/0323292 A1* | 11/2016 | Dorfman | H04L 67/02 | |
| 2017/0046510 A1* | 2/2017 | Chen | G06F 21/552 | |
| 2017/0092054 A1* | 3/2017 | Petersen | G07F 17/3209 | |
| 2017/0093920 A1* | 3/2017 | Ducatel | G06F 21/316 | |
| 2017/0109509 A1* | 4/2017 | Baghdasaryan | G06Q 20/40 | |
| 2017/0134412 A1* | 5/2017 | Cheng | H04L 63/1425 | |
| 2017/0180339 A1* | 6/2017 | Cheng | H04L 63/08 | |
| 2017/0289134 A1* | 10/2017 | Bradley | H04L 63/102 | |
| 2017/0289168 A1* | 10/2017 | Bar | H04L 63/0853 | |
| 2017/0300911 A1* | 10/2017 | Alnajem | G06Q 20/4014 | |
| 2017/0303111 A1* | 10/2017 | Kohli | G06Q 20/3224 | |
| 2017/0318007 A1* | 11/2017 | Cleeve | H04L 9/3234 | |
| 2018/0005209 A1* | 1/2018 | Ranganathan | G06Q 20/12 | |
| 2018/0007060 A1* | 1/2018 | Leblang | H04L 63/105 | |
| 2018/0041518 A1* | 2/2018 | Jacobs | H04W 4/029 | |
| 2018/0069896 A1* | 3/2018 | Urmanov | H04L 63/1483 | |
| 2018/0152471 A1* | 5/2018 | Jakobsson | G06Q 50/01 | |
| 2018/0204215 A1* | 7/2018 | Hu | G06Q 20/401 | |
| 2018/0308160 A1* | 10/2018 | Liu | G16Z 99/00 | |
| 2018/0375955 A1* | 12/2018 | Ferenczi | G06Q 30/0609 | |

OTHER PUBLICATIONS

Bakar et al. "Adaptive Authentication: Issues and Challenges." *2013 World Congress on Computer and Information Technology, IEEE* (2013).

(56) References Cited

OTHER PUBLICATIONS

Li et al. "Behaviour profiling for transparent authentication for mobile devices." ECU Publications (2011).

\* cited by examiner

SYSTEM AND METHODS TO ESTABLISH USER PROFILE USING MULTIPLE CHANNELS

CROSS-REFERENCE TO RELATED APPLICATIONS

This patent application is a divisional of U.S. patent application Ser. No. 15/655,076, filed Jul. 20, 2017, which claims the benefit of U.S. Provisional Patent Application No. 62/364,439, filed Jul. 20, 2016, both of which are incorporated by reference.

BACKGROUND

Consumers access services and information hosted by a network via a remote device. For instance, consumers may access health care related websites and internet-based applications to review numerous types of health-related information and services. For example, a consumer may log into a health care organization website or application in order to view available products or utilize one of many services offered by the health care organization. Increasingly, consumers not only access these websites and applications with personal computers, but also with smart phones and other electronic devices. In order to provide data security for sensitive information, websites and applications must employ a secure authentication system that can accommodate the full range of devices. Further, increased data security is generally commensurate with inconvenience for consumers, and increased data security may not be necessary for all consumers.

BRIEF SUMMARY

In certain embodiments, a method of establishing a user profile using multiple channels, such as device, application and authentication channels is provided. Embodiments allow compatibility of the user profile across several authentication systems. The user profile is created upon registration and is updated with attributes after authenticating and authorizing the user according to a pre-defined assurance level. The user profile contains attributes pertaining to the user and user device, including user device, application and authentication attributes. These attributes can be analyzed by authentication systems to optimize data security.

Embodiments of the disclosure provide a method for creating a user profile for authenticating a user to access information and services protected by an authentication system. The method includes: performing an authentication of a user attempting access to the information and services from a user device, wherein the information and services are protected by the authentication system; determining whether the user is a new user never before having accessed the information and services protected by the authentication system; collecting attributes uniquely identifying the user and compiling those as part of the user profile; and storing the user profile in a database associated with the authentication system.

Further embodiments of the disclosure provide a method for authenticating a user to access information and services protected by an authentication system. The method includes: performing an authentication of a user device accessing the information and services protected by the authentication system; capturing device, application and user authentication attributes during the authentication; comparing the captured device, application and user authentication attributes against previously obtained device, application and user authentication attributes stored as part of a user profile; calculating a risk score based on the comparison of the captured device, application and user authentication attributes against the previously obtained device, application and user authentication attributes; and determining whether to grant access to the information and services based on the risk score.

Yet other embodiments of the disclosure provide a non-transitory computer readable storage device for authenticating a user to access information and services protected by an authentication system. The non-transitory computer readable storage device having computer executable instructions for performing the steps of: performing an authentication of a user device accessing the information and services protected by the authentication system; capturing device, application and user authentication attributes during the authentication; comparing the captured device, application and user authentication attributes against previously obtained device, application and user authentication attributes stored as part of a user profile; calculating a risk score based on the comparison of the captured device, application and user authentication attributes against the previously obtained device, application and user authentication attributes; and determining whether to grant access to the information and services based on the risk score.

BRIEF DESCRIPTION OF THE SEVERAL VIEWS OF THE DRAWINGS

Exemplary embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
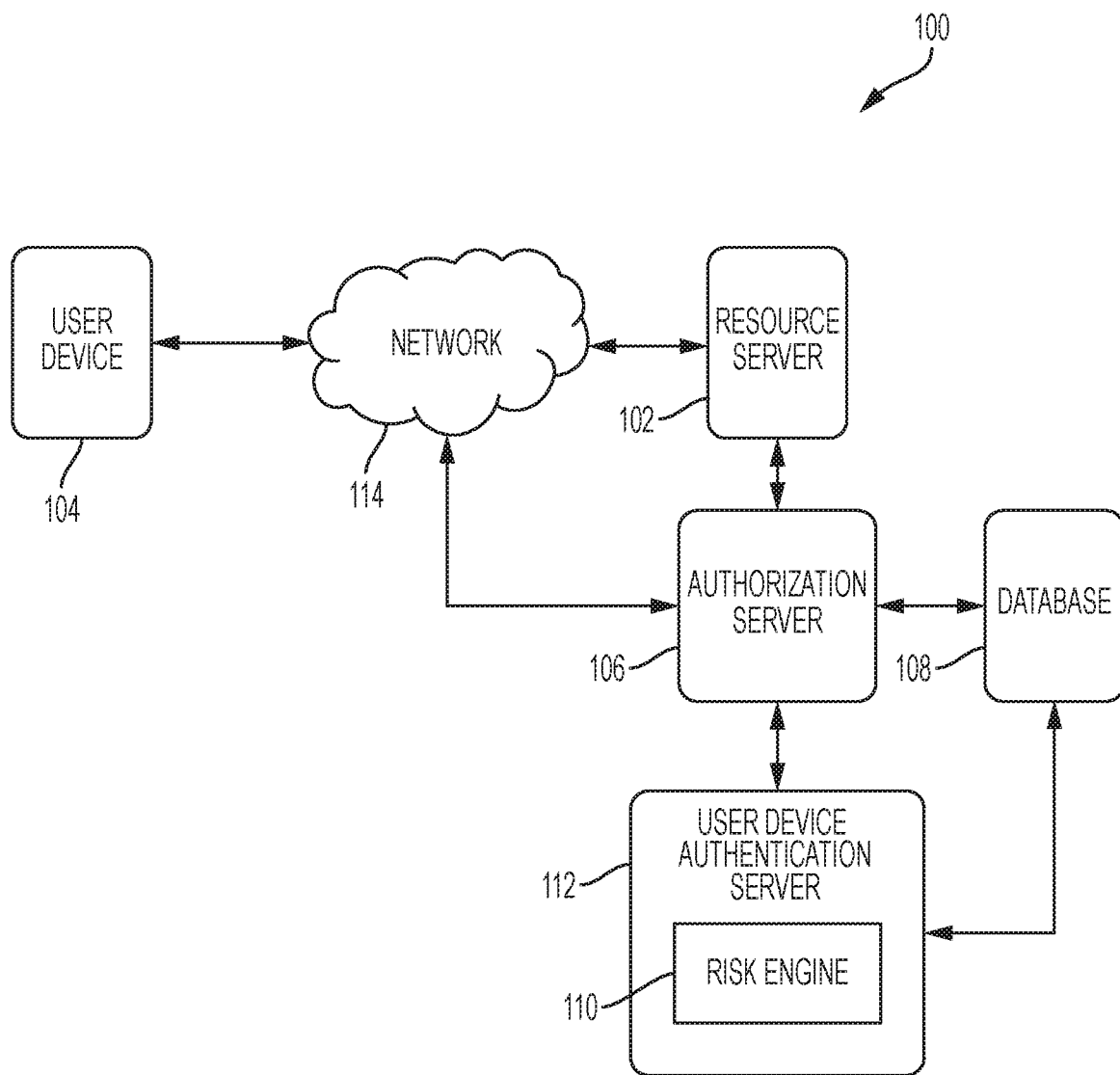
FIG. 1 is an authentication system, in accordance with an embodiment of the disclosure.

Embodiments disclose a method and system of establishing a user profile that is compatible across authentication systems. The user profile is a collection of user and/or user device attributes that are useful in identifying a user and/or user device. These attributes are collected and stored as part of the user profile such that an authentication system can access the user profile in order to make risk-based decisions.

In certain embodiments, these risk based decisions are directed to authorization and authentication of the user and/or user device with an application monitored and protected by the authentication system.

With respect to the user profile, any attribute can be used that furthers the goal of making risk-based decisions. For example, attributes may relate to cryptographic keys such as certificates issued to the user or user device. Attributes may also relate to environment such as geographic location, time of day, day of week, user biometric data or device hygiene. Attributes may also relate to user behavior, such as usage patterns, swipe patterns, etc. It will be understood to those of ordinary skill in the art that the number and types of attributes are not intended to be limited to any specific examples or combinations.

In certain embodiments, the user profile is interchangeable across different authentication systems, and thus the attributes are accessible regardless of the authentication system used. As such, a user will be able to access services from a new user device more efficiently because the system will be able to recognize certain user attributes even from the new device because the stored user profile.

For example, because implementation of the user profile can be independent of underlying authentication systems, a particular implementation can be conveniently replaced using defined protocols. Additionally the user profile is accessible by a plurality of devices associated with a user, thereby allowing an optimized security system using risk-based decisions. Furthermore, authentication can be designed to maintain security while requiring the user to input relatively little information. As such, a user will be able to more efficiently authenticate access from a new user device by the system making risk based decisions based on the stored user profile.

In an embodiment, the user profile is created upon registration within an authentication system. The user profile may be stored in a secure database, where the database and user profile can be accessed according to an authorization policy. Registration may encompass registration of a user and/or registration of a user device. In an embodiment, registration depends on establishing and ensuring the user's identity such that device and user parameters collected and added to the user profile are accurately attributed to the correct user and user device. Moreover, in an embodiment, when a user registers with any new service, the new registration is linked with the former registrations in the database, and the user profile is updated.

The user profile can be updated with attributes pertaining to the user and/or user device as those attributes are collected over time. In an embodiment, this recurring update may be performed each time a user and/or user device is authenticated and/or authorized within an authorization system. In an embodiment, the updating may depend on certain assurance levels defined by an authentication policy or authorization policy. For instance, updated user and/or user device parameters may or may not be collected based on the user and/or user device achieving a certain assurance level that indicates a confidence that the user and/or user device is accurately authenticated within the system.

Turning now to the figures, various embodiments of the user profile within the context of an authentication system will be discussed in view of FIGS. 1-5. FIG. 1 illustrates a network architecture for an authentication system 100. It should be understood by those of ordinary skill that the user profile is not intended to be limited to any particular authentication system, authorization system, or network architecture. As such, authentication system 100 illustrates an exemplary embodiment of an authentication system utilizing the user profile.

In the illustrated embodiment, the authentication system 100 includes a resource server 102 that hosts various network resources including web pages and applications/information. User device 104 is configured as a terminal running an application requesting to access the various network resources including web pages and applications/information hosted by the resource server 102. In the illustrated embodiment, the user device 104 connects to the resource server 102 over a network 114.

Prior to accessing the various network resources including web pages and applications/information hosted at the resource server 102, the user device 104 must be authenticated. An authorization server 106, associated with the resource server 102, performs the authentication/re-authentication of the user device 104 by calling a user device authentication server 112. In the illustrated embodiment, only a single user device authentication server 112 is provided; however, in other embodiments, a plurality of device authentication servers may be present to provide various types of authentication.

The authorization server 106 authenticates the user device 104 by collecting data from the user device 104 and providing it to the user device authentication server 112 for comparing it with data collected as part of the user profile and stored in a database 108 associated with the user device 104. In certain embodiments, the authorization server 106 and the user device authentication server 112 may collectively be referred to as an authentication server.

An authentication process is performed by a Risk Engine 110 hosted by the user device authentication server 112. The Risk Engine 110 accesses data stored in the database 108 pertaining to the user device 104 and/or a user profile of the user of the user device 104 in order to make an efficient authentication or re-authentication of the user device 104 prior to granting/continuing access to the various network resources including web pages and applications/information of the resource server 102. When a user device and/or a user profile are enrolled with the Risk Engine 110, the user device and/or user profile attributes are collected and stored in the database 108 and further utilized to update the stored user profile for the user of the user device 104. In certain embodiments, these user device and/or user profile attributes are compiled to determine an associated score value that sets a threshold associated with a specific authentication method for future authentications performed by the Risk Engine 110.

Some embodiments may use the term "system" to generally refer to a network architecture, such as the network architecture of the authentication system 100 of FIG. 1. This system (authentication system 100) may be used, for example, by a health care organization that offers web-based services to consumers. To enhance understanding, the example authentication system 100 in FIG. 1 is provided to describe exemplary features of the method described herein. However, any suitable network architecture may be used to accomplish objectives of the invention. In some embodiments, the "user" may refer to a consumer, such as a person who is seeking health related services through a service hosted by a health care organization through a website or web-based application.

Figure 2:
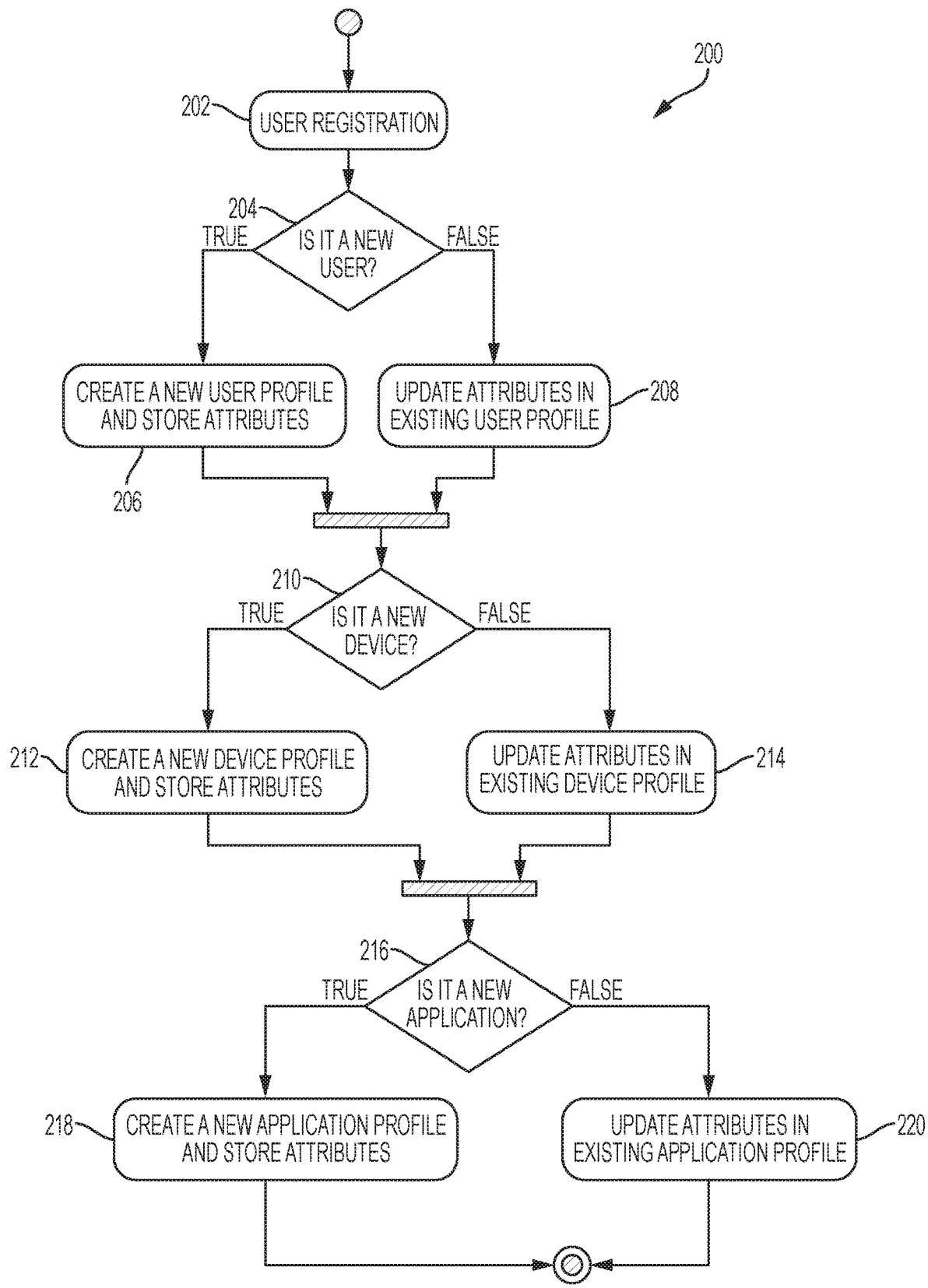
FIG. 2 is a flow chart for creating a user profile, in accordance with an embodiment of the disclosure.

FIG. 2 illustrates a flow chart 200 for creating the user profile stored in the database 108 (see FIG. 1) of the authentication system 100. At step 202 of the flow chart 200 a user registration is performed. During the user registration, at step 204, the authentication system 100 determines whether the user registration is for a new user. If it is a new user, then, at step 206, a new user profile is created to store user attributes. If it is determined to be an existing user, then, at step 208, the existing user profile is updated with new user attributes in order to keep the existing user profile up to date. At step 210, the authentication system 100 then checks whether the user is using a new device during the registration. If it is a new device, then, at step 212, a new device profile is created to store device attributes from the new device and it is further associated with the relevant user profile. If it is determined to be an existing device, then, at step 214, an existing device profile, associated with the relevant user profile, is updated with new device attributes in order to keep the existing device profile up to date. At step 216, the authentication system 100 then checks whether the application being ran on the device is using a new application. If it is a new application, then, at step 218, a new application profile is created to store application attributes from the new application. This new application profile is further associated with the relevant user profile. If it is determined to be an existing application, then, at step 220, an existing application profile, associated with the relevant user profile, is updated with new application attributes in order to keep the existing application profile up to date.

Figure 3:
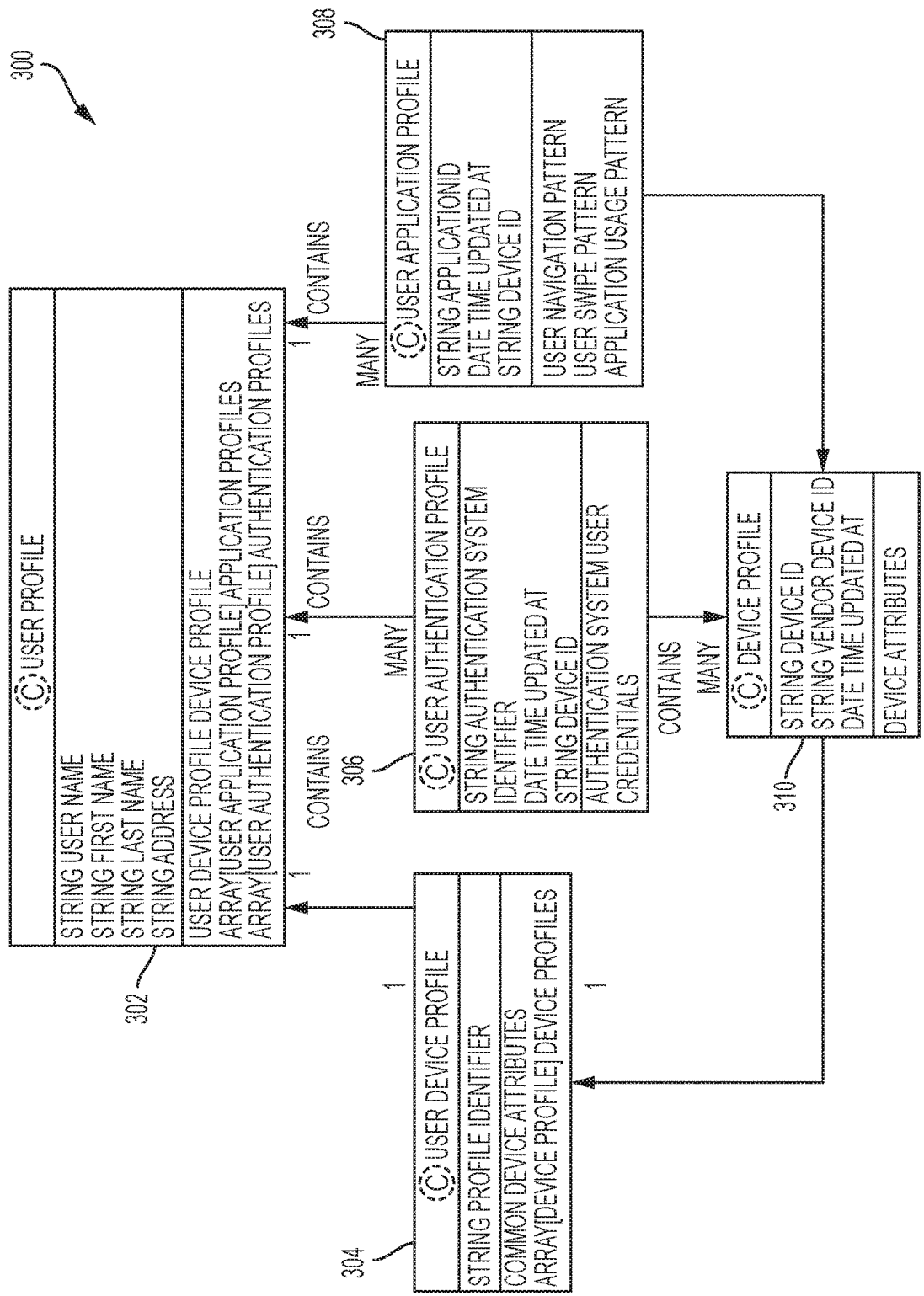
FIG. 3 is a data structure of a user profile, in accordance with an embodiment of the disclosure.

FIG. 3 illustrates a data structure 300 of the user profile 302. As illustrated, the user profile 302 contains multiple channels including one or more user device profiles 304, one or more user authentication profiles 306 and one or more user application profiles 308. As further illustrated, the user authentication profile 306 and user application profile 308 may further contain device attributes that are collected as part of a further device profile 310, which in certain embodiments, are provided to and incorporated in the user device profile 304.

The user profile 302 contains identification information utilized to identify an associated user. This identification information is stored as a "handle" for the user profile 302 allowing the user profile 302, once stored in the database 108 (see FIG. 1), to be searched and found within the database 108 based on the identification information. In the illustrated embodiment, the identification data includes a username, first name, last name and address of the user. In other embodiments, any information relevant to identify the user may be incorporated as the identification information.

The user profile 302 further includes user relevant attribute data collected while registering/authenticating the user with the authentication system 100 (see FIG. 1). In certain embodiments, this attribute data is organized in arrays stored in the user profile 302 with reference to the user device profile 304, user authentication profile 306 and the user application profile 308. This attribute data is collected during the registering and authentication process for accessing the information/application protected by the authentication system 100. Specifically, the attributes are collected with respect to the user during authentication, the user device being utilized to access the authentication system 100 and the application running on the user device being authenticated. Each attribute is collected along with a date and time such that updates can be performed as the original attribute data becomes older and new attribute data is collected.

This attribute data is stored as sub-components of the data structure 300. One such sub-component is the user device profile 304, which stores attributes relevant to one or more user devices utilized by the user when registering/authenticating within the authentication system 100 (see FIG. 1). In certain embodiments, the user device profile 304 may contain attributes such as a device type, a device hardware/software configuration, an access technology used to access the authentication system 100 and/or device hygiene data.

Another sub-component is the user authentication profile 306. This profile includes attributes regarding the user that is being registered/authenticated within the authentication system 100 (see FIG. 1). Exemplary types of user attributes may be user credentials (login/password/secret question data) or user biometric data utilized to access the information/application protected by the authentication system 100. User biometric data may include fingerprint data, eye scan data, and/or facial recognition data.

Another sub-component is the user application profile 308. This profile includes attributes regarding the application running on the user device and user being registered/authenticated within the authentication system 100 (see FIG. 1). Exemplary types of application attributes may be an application identifier (ID), a navigation pattern with respect to how the user navigates the application while accessing the information/application protected by the authentication system 100, a swipe pattern for touch sensitive displays utilized when navigating the application, and/or an application usage pattern such as what days and what times during the day the user utilizes the application.

In the illustrated embodiment, the user authentication profile 306 and the user application profile 308 additionally collect device attributes (e.g., a device type, a device hardware/software configuration, an access technology used to access the authentication system 100 and/or device hygiene data) with respect to the devices being utilized by the user during the registration/authentication. These device attributes are associated with the various user authentication and user application attributes, and are additionally collected as part of a device profile 310. These device attributes associated with the attributes stored in the user authentication profile 306 and the user application profile 308 are collected in the device profile 310 and provided to the user device profile 304 for use with the user profile 302.

Figure 4:
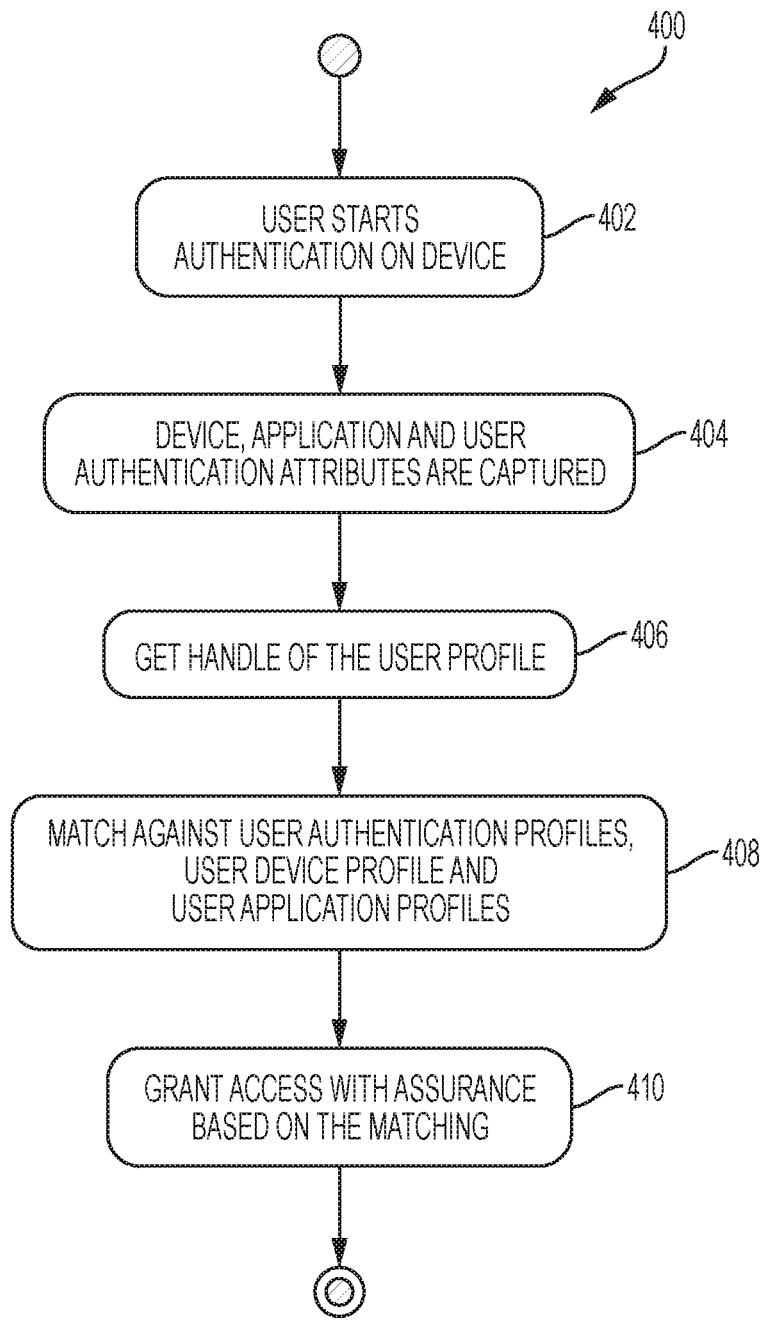
FIG. 4 is a flow chart illustrating a user authentication utilizing a user profile, in accordance with an embodiment of the disclosure.

FIG. 4 illustrates a flow chart 400 showing a user authentication utilizing a user profile, such as the user profile 302 in the illustrated embodiment of FIG. 3. During authentication at the authentication system 100 (see FIG. 1), at step 402, the user starts the authentication on a user device. At step 404, device, application and user authentication attributes are captured. At step 406, based on identification information of the user collected during the authentication, a handle of the user profile 302 is obtained so to access the contents of the user profile in database 108. At step 408, the captured device, user and application attributes are compared against those stored in the user profile 302, and a risk score is determined by the risk engine 110 of the user device authentication server 112 based on the comparison. At step 410, a decision on whether to grant access to the user device is then made based on the risk score. In one embodiment, the decision on whether to grant access is based on comparing the calculated risk score against a predetermined risk threshold. In this embodiment, a high, medium or low assurance level of the authentication can be performed based on a level of the predetermined threshold.

Figure 5:
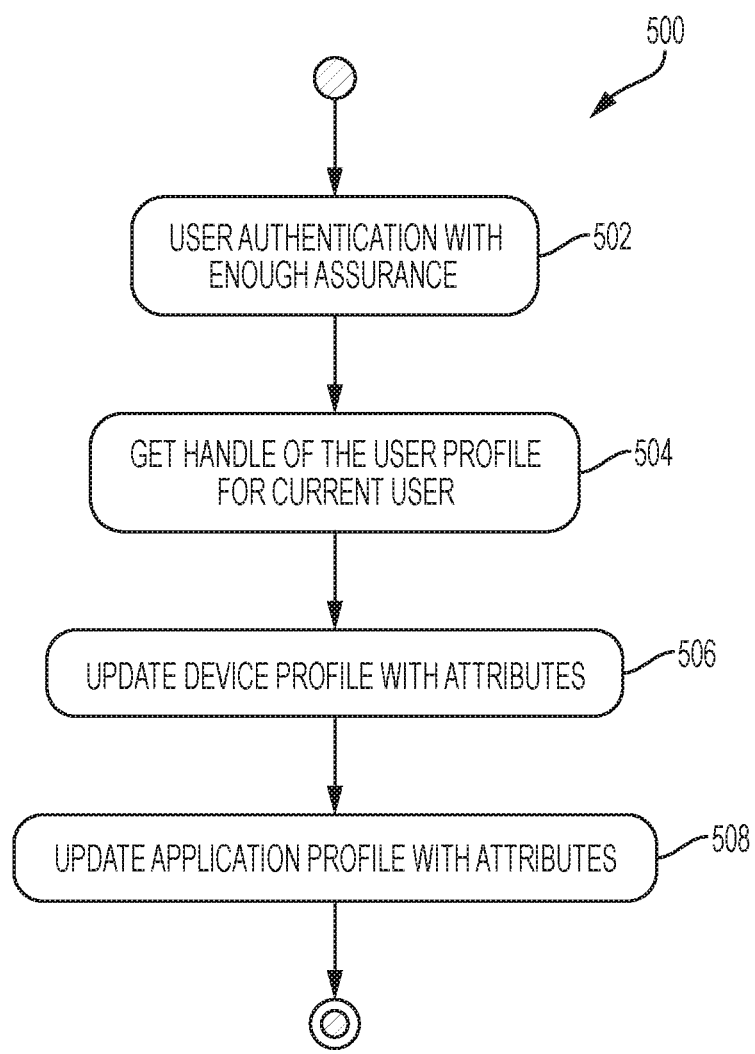
FIG. 5 is a flow chart illustrating a user profile update with a high authentication assurance, in accordance with an embodiment of the disclosure.

FIG. 5 illustrates a flow chart 500 showing a user profile update with a high or medium authentication assurance. The update is performed in order to update the attribute data stored as part of the user profile, as shown in the user profile 302 of FIG. 3. At step 502, a user profile update is performed during a user authentication with a high or medium assurance of the authentication, as performed by the authentication system 100 (see FIG. 1) based on a user profile such as user profile 302 (see FIG. 3). In one embodiment, the assurance level (high or medium) is set by selecting a different predetermined threshold for comparison against the risk score calculated by the risk engine 110 based on collected attributes.

During the update illustrated in flow chart 500, at step 504, a handle of the user profile is obtained for the current user. The relevant user profile based on the handle is obtained and updated with the collected user, application and device profile attribute data at steps 506 and 508. In the illustrated embodiment, the device profile 304 (see FIG. 3) of the user profile 302 is updated prior to the application profile 308 and the authentication profile 306 of the user profile 302. The updated user profile 302 is then stored in database 108 (see FIG. 1) for subsequent authentications.

Figure 6:
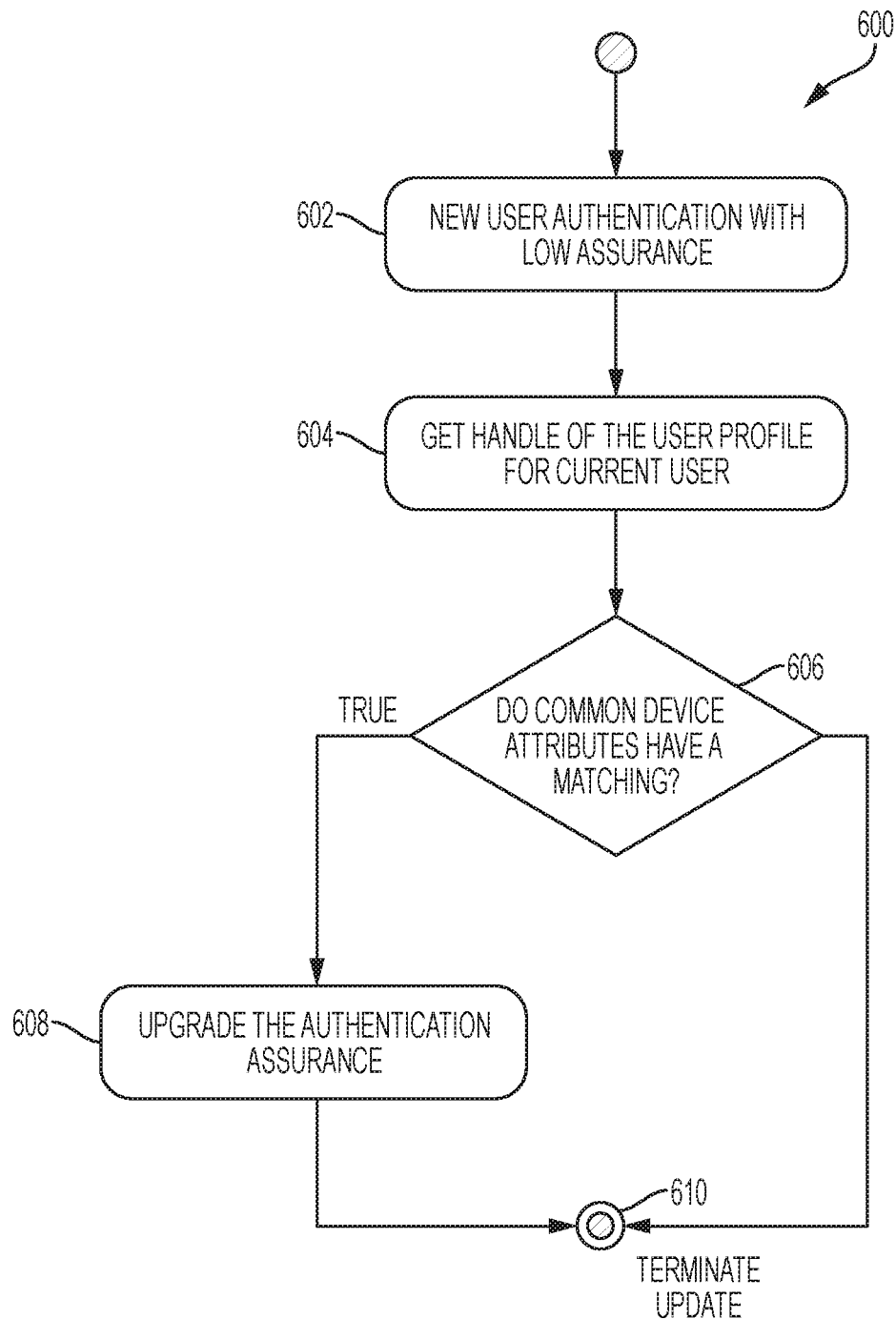
FIG. 6 is a flow chart illustrating a user profile update with a low authentication assurance, in accordance with an embodiment of the disclosure.

FIG. 6 illustrates a flow chart 600 showing a user profile update with a low authentication assurance. In one embodiment, the low authentication assurance is obtained by selecting a predetermined threshold that when used against a comparison of a calculated risk score, obtains the low authentication assurance.

In flow chart 600, at step 602, a user authentication with low assurance is performed by authentication system 100 (see FIG. 1). Device, application and authentication profile attributes are collected during this authentication with low assurance. At step 604, a handle of the user profile is obtained from database 108 for the current user. Once the handle is obtained from the database 108, at step 606, a check of whether common device attributes exist between those stored in the existing user profile and the newly collected attributes during the authentication is performed. If there are matching attributes, then the authentication is upgraded to a higher authentication, at step 608. If there are no matching attributes, then the update is terminated without updating any attributes, at step 610.

Figure 7:
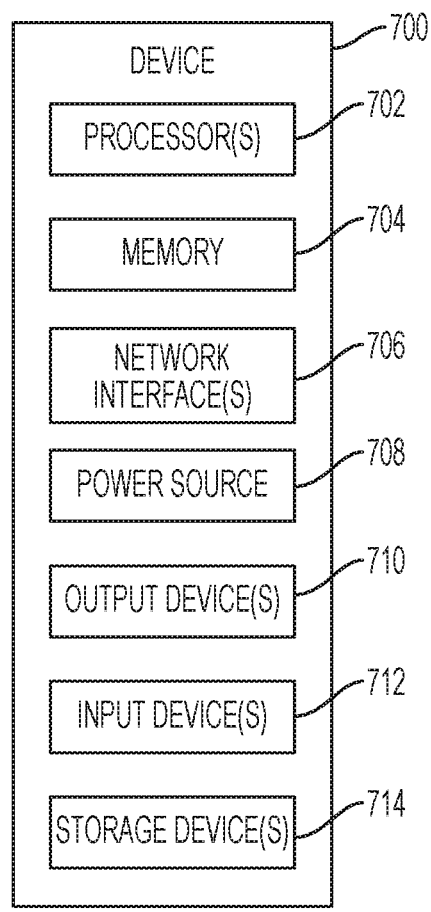
FIG. 7 provides an exemplary electronic device according to an embodiment of the disclosure.

FIG. 7 illustrates an electronic device 700 according to an embodiment of the disclosure. Electronic devices, for example, servers and user devices comprising the resource server 702, user device 704, authorization server 706, database 708, and device authentication server 712 running the Risk Engine 710, in certain embodiments, may be computer devices as shown in FIG. 7. The device 700 may include one or more processors 702, memory 704, network interfaces 706, power source 708, output devices 710, input devices 712, and storage devices 714. Although not explicitly shown in FIG. 7, each component provided is interconnected physically, communicatively, and/or operatively for inter-component communications in order to realize functionality ascribed to the various entities identified in FIG. 1 and referenced in FIGS. 2-6. To simplify the discussion, the singular form will be used for all components identified in FIG. 7 when appropriate, but the use of the singular does not limit the discussion to only one of each component. For example, multiple processors may implement functionality attributed to processor 702.

Processor 702 is configured to implement functions and/or process instructions for execution within device 700. For example, processor 702 executes instructions stored in memory 704 or instructions stored on a storage device 714. In certain embodiments, instructions stored on storage device 714 are transferred to memory 704 for execution at processor 702. Memory 704, which may be a non-transient, computer-readable storage medium, is configured to store information within device 700 during operation. In some embodiments, memory 704 includes a temporary memory that does not retain information stored when the device 700 is turned off. Examples of such temporary memory include volatile memories such as random access memories (RAM), dynamic random access memories (DRAM), and static random access memories (SRAM). Memory 704 also maintains program instructions for execution by the processor 702 and serves as a conduit for other storage devices (internal or external) coupled to device 700 to gain access to processor 702.

Storage device 714 includes one or more non-transient computer-readable storage media. Storage device 714 is provided to store larger amounts of information than memory 704, and in some instances, configured for long-term storage of information. In some embodiments, the storage device 714 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 706 are used to communicate with external devices and/or servers. The device 700 may comprise multiple network interfaces 706 to facilitate communication via multiple types of networks. Network interfaces 706 may comprise network interface cards, such as Ethernet cards, optical transceivers, radio frequency transceivers, or any other type of device that can send and receive information. Non-limiting examples of network interfaces 1206 include radios compatible with several Wi-Fi standards, 3G, 4G, Long-Term Evolution (LTE), Bluetooth®, etc.

Power source 708 provides power to device 700. For example, device 700 may be battery powered through rechargeable or non-rechargeable batteries utilizing nickel-cadmium or other suitable material. Power source 708 may include a regulator for regulating power from the power grid in the case of a device plugged into a wall outlet, and in some devices, power source 708 may utilize energy scavenging of ubiquitous radio frequency (RF) signals to provide power to device 700.

Device 700 may also be equipped with one or more output devices 710. Output device 710 is configured to provide output to a user using tactile, audio, and/or video information. Examples of output device 710 may include a display (cathode ray tube (CRT) display, liquid crystal display (LCD) display, LCD/light emitting diode (LED) display, organic LED display, etc.), a sound card, a video graphics adapter card, speakers, magnetic, or any other type of device that may generate an output intelligible to a user.

Device 700 is equipped with one or more input devices 712. Input devices 712 are configured to receive input from a user or the environment where device 700 resides. In certain instances, input devices 712 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for device 700 are functionally and communicatively coupled to achieve certain behaviors. In some embodiments, these behaviors are controlled by software running on an operating system of device 700.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims)

are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate and intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for creating a user profile for authenticating a user to access information and services protected by an authentication system, the method comprising:
    performing an authentication of a user attempting access to the information and services from a user device, wherein the information and services are protected by the authentication system;
    determining whether the user is a new user never before having accessed the information and services protected by the authentication system;
    collecting attributes uniquely identifying the user and compiling those as part of the user profile;
    determining whether the user device is a new user device never before having accessed the information and services protected by the authentication system;
    collecting attributes uniquely identifying the user device and compiling those as part of the user profile;
    determining whether an application running on the user device is a new application never before having accessed the information and services protected by the authentication system;
    collecting attributes uniquely identifying the user and the user device pertaining to the application and compiling those as part of the user profile; and
    storing the user profile in a database associated with the authentication system,
    wherein the attributes uniquely identifying the user and the user device pertaining to the application comprise a navigation pattern with respect to how the user navigates the application while accessing the information and services protected by the authentication system, and
    wherein a data structure of the user profile comprises a plurality of sub-component profiles, the sub-component profiles comprise a user device profile, a user authentication profile, and a user application profile, the attributes uniquely identifying the user are compiled under the user authentication profile, the attributes uniquely identifying the user device are compiled as part of the user device profile, and the attributes uniquely identifying the user and the user device pertaining to the application are compiled as part of the user application profile.

2. The method of claim 1, wherein the attributes uniquely identifying the user comprise user credentials or user biometric data for accessing the information and services protected by the authentication system.

3. The method of claim 1, wherein the attributes uniquely identifying the user device comprise one or more of a device type, a device hardware/software configuration, an access technology used to access the information and services and device hygiene data.

4. The method of claim 1, wherein the application usage pattern comprises a day and time when the application is utilized.

5. The method of claim 1, wherein the user device running the application comprises a touch sensitive display and the attributes uniquely identifying the user and the user device pertaining to the application further comprises a swipe pattern for touch sensitive displays utilized when navigating the application at the user device.

6. The method of claim 1, wherein the data structure of the user profile further comprises a plurality of arrays, and the attributes uniquely identifying the user and compiled under the user authentication profile is organized under a first array of the plurality of arrays, the attributes uniquely identifying the user device and compiled as part of the user device profile is organized under a second array of the plurality of arrays, and the attributes uniquely identifying the user and the user device pertaining to the application and compiled as part of the user application profile is organized under a third array of the plurality of arrays.

7. An authentication system configured to enable a user profile for authenticating a user to access information and services protected by the authentication system, the authentication system comprising:
    a processor; and
    a memory storing instructions that when executed configure the processor to perform steps comprising:
        performing an authentication of a user attempting access to the information and services from a user device, wherein the information and services are protected by the authentication system;
        determining whether the user is a new user never before having accessed the information and services protected by the authentication system;
        collecting attributes uniquely identifying the user and compiling those as part of the user profile;
        determining whether the user device is a new user device never before having accessed the information and services protected by the authentication system;

collecting attributes uniquely identifying the user device and compiling those as part of the user profile;

determining whether an application running on the user device is a new application never before having accessed the information and services protected by the authentication system;

collecting attributes uniquely identifying the user and the user device pertaining to the application and compiling those as part of the user profile; and storing the user profile in a database associated with the authentication system, wherein the attributes uniquely identifying the user and the user device pertaining to the application comprise a navigation pattern with respect to how the user navigates the application while accessing the information and services protected by the authentication system, and wherein a data structure of the user profile comprises a plurality of sub-component profiles, the sub-component profiles comprise a user device profile, a user authentication profile, and a user application profile, the attributes uniquely identifying the user are compiled under the user authentication profile, the attributes uniquely identifying the user device are compiled as part of the user device profile, and the attributes uniquely identifying the user and the user device pertaining to the application are compiled as part of the user application profile.

8. The authentication system of claim 7, wherein the attributes uniquely identifying the user comprise user credentials or user biometric data for accessing the information and services protected by the authentication system.

9. The authentication system of claim 7, wherein the attributes uniquely identifying the user device comprise one or more of a device type, a device hardware/software configuration, an access technology used to access the information and services and device hygiene data.

10. The authentication system of claim 7, wherein the application usage pattern comprises a day and time when the application is utilized.

11. The authentication system of claim 7, wherein the user device running the application comprises a touch sensitive display and the attributes uniquely identifying the user and the user device pertaining to the application further comprises a swipe pattern for touch sensitive displays utilized when navigating the application at the user device.

12. The authentication system of claim 7, wherein the data structure of the user profile further comprises a plurality of arrays, and the attributes uniquely identifying the user and compiled under the user authentication profile is organized under a first array of the plurality of arrays, the attributes uniquely identifying the user device and compiled as part of the user device profile is organized under a second array of the plurality of arrays, and the attributes uniquely identifying the user and the user device pertaining to the application and compiled as part of the user application profile is organized under a third array of the plurality of arrays.

13. A non-transitory computer readable medium storing instructions for enabling a user profile for authenticating a user to access information and services protected by an authentication system, when the instructions are executed by a computer, the computer is configured to perform steps comprising:

performing an authentication of a user attempting access to the information and services from a user device, wherein the information and services are protected by the authentication system;

determining whether the user is a new user never before having accessed the information and services protected by the authentication system;

collecting attributes uniquely identifying the user and compiling those as part of the user profile;

determining whether the user device is a new user device never before having accessed the information and services protected by the authentication system;

collecting attributes uniquely identifying the user device and compiling those as part of the user profile;

determining whether an application running on the user device is a new application never before having accessed the information and services protected by the authentication system;

collecting attributes uniquely identifying the user and the user device pertaining to the application and compiling those as part of the user profile; and storing the user profile in a database associated with the authentication system, wherein the attributes uniquely identifying the user and the user device pertaining to the application comprise a navigation pattern with respect to how the user navigates the application while accessing the information and services protected by the authentication system, and wherein a data structure of the user profile comprises a plurality of sub-component profiles, the sub-component profiles comprise a user device profile, a user authentication profile, and a user application profile, the attributes uniquely identifying the user are compiled under the user authentication profile, the attributes uniquely identifying the user device are compiled as part of the user device profile, and the attributes uniquely identifying the user and the user device pertaining to the application are compiled as part of the user application profile.

14. The non-transitory computer readable medium of claim 13, wherein the attributes uniquely identifying the user comprise user credentials or user biometric data for accessing the information and services protected by the authentication system.

15. The non-transitory computer readable medium of claim 13, wherein the attributes uniquely identifying the user device comprise one or more of a device type, a device hardware/software configuration, an access technology used to access the information and services and device hygiene data.

16. The non-transitory computer readable medium of claim 13, wherein the application usage pattern comprises a day and time when the application is utilized.

17. The non-transitory computer readable medium of claim 13, wherein the user device running the application comprises a touch sensitive display and the attributes uniquely identifying the user and the user device pertaining to the application further comprises a swipe pattern for touch sensitive displays utilized when navigating the application at the user device.

18. The non-transitory computer readable medium of claim 13, wherein the data structure of the user profile further comprises a plurality of arrays, and the attributes uniquely identifying the user and compiled under the user authentication profile is organized under a first array of the plurality of arrays, the attributes uniquely identifying the user device and compiled as part of the user device profile is organized under a second array of the plurality of arrays, and the attributes uniquely identifying the user and the user device pertaining to the application and compiled as part of the user application profile is organized under a third array of the plurality of arrays.

* * * * *